(12) United States Patent
Rogers

(10) Patent No.: US 6,550,178 B1
(45) Date of Patent: Apr. 22, 2003

(54) SPEAR ASSEMBLY

(76) Inventor: William H. Rogers, 7407 Bowden Rd., Jacksonville, FL (US) 32216

( * ) Notice: Subject to any disclaimer, the term of this patent is extended or adjusted under 35 U.S.C. 154(b) by 0 days.

(21) Appl. No.: 09/930,061

(22) Filed: Aug. 15, 2001

(51) Int. Cl.[7] .............................................. A01K 81/04
(52) U.S. Cl. ........................................................ 43/6
(58) Field of Search .............................. 43/6, 5, 18 R; 473/578; D22/102, 117; 294/61, 19 R; 124/17, 20 R; 403/204, 267; 24/265 EZ; 29/450, 453, 460

(56) References Cited

U.S. PATENT DOCUMENTS

| | | | |
|---|---|---|---|
| 406,526 A | * | 7/1889 | Lorenz |
| 1,009,553 A | * | 11/1911 | Neuman |
| 3,726,245 A | * | 4/1973 | Critcher ........................ 114/61 |
| 4,027,418 A | * | 6/1977 | Baldi et al. ........................ 43/6 |
| 4,052,808 A | * | 10/1977 | Crabtree ............................ 43/6 |
| 4,209,929 A | * | 7/1980 | Mishima ............................ 43/6 |
| 4,429,480 A | * | 2/1984 | Stude, II ............................ 43/6 |
| 4,720,993 A | * | 1/1988 | Stude ................................ 43/6 |
| 4,877,169 A | * | 10/1989 | Grim ............................ 224/331 |
| 5,163,242 A | * | 11/1992 | Smith ................................ 43/6 |
| 5,243,778 A | * | 9/1993 | Henley .............................. 43/6 |
| 5,335,439 A | * | 8/1994 | Horton .............................. 43/6 |
| 2001/0032409 A1 | * | 10/2001 | Nicolai .............................. 43/6 |

OTHER PUBLICATIONS

Trident Diving Equiment, 2002, Trident Website "http://www.tridentdive.com/page123.htm".*

Reid Tool, 2002, Reid Tool Website "http://www.reidtool.com/PDF/317.pdf".*

* cited by examiner

Primary Examiner—Charles T. Jordan
Assistant Examiner—Bret Hayes
(74) Attorney, Agent, or Firm—Arthur G. Yeager

(57) ABSTRACT

A spear assembly for fishing underwater and inside undersea structures includes an elongated hollow shaft filled with rigid plastic foam material to inhibit entry of water and to rigidify the shaft and has a rear portion and a forward portion, which may include a metallic rod to add weight and strength to the punch delivered by the spear, and a rear portion rigidly connected to the forward portion, a replaceable sharp spear tip for piercing the fish is located at a proximal end of the forward portion, an elastic band for propelling the shaft when the band is released is carried on a movable mechanical means to enable a diver to quickly adjust the tension power of the band by moving it close to the spear tip while keeping the shooting hand indexed in the same release position near the forward portion of the spear. The proximity of the elastic band and the spear tip enables the diver to maneuver the forward portion inside and around undersea structures to spear the nearby fish. An alternative embodiment of the present invention includes a pair of tension bands carried on respective slidable lock means. The bands are located diametrically opposite from each other on both sides of the shaft to provide equalized forces on the shaft, which assist in forcing the spear to be propelled in the appropriate longitudinal axis of the shaft.

21 Claims, 3 Drawing Sheets

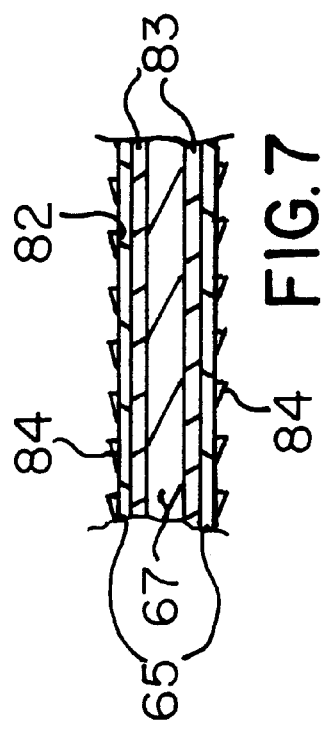
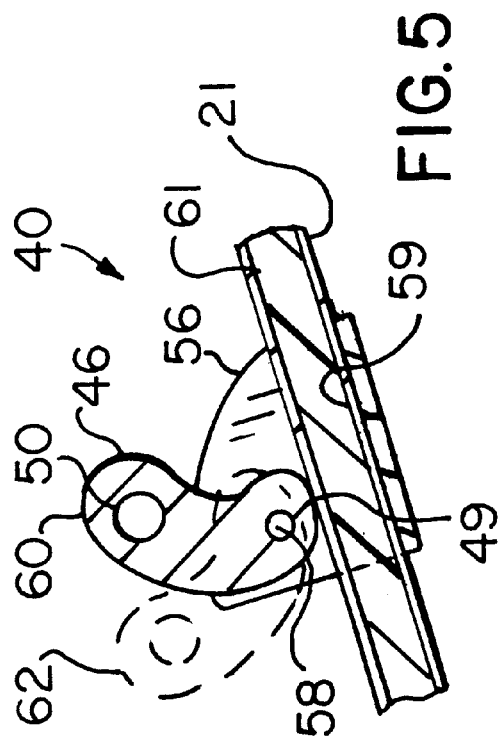
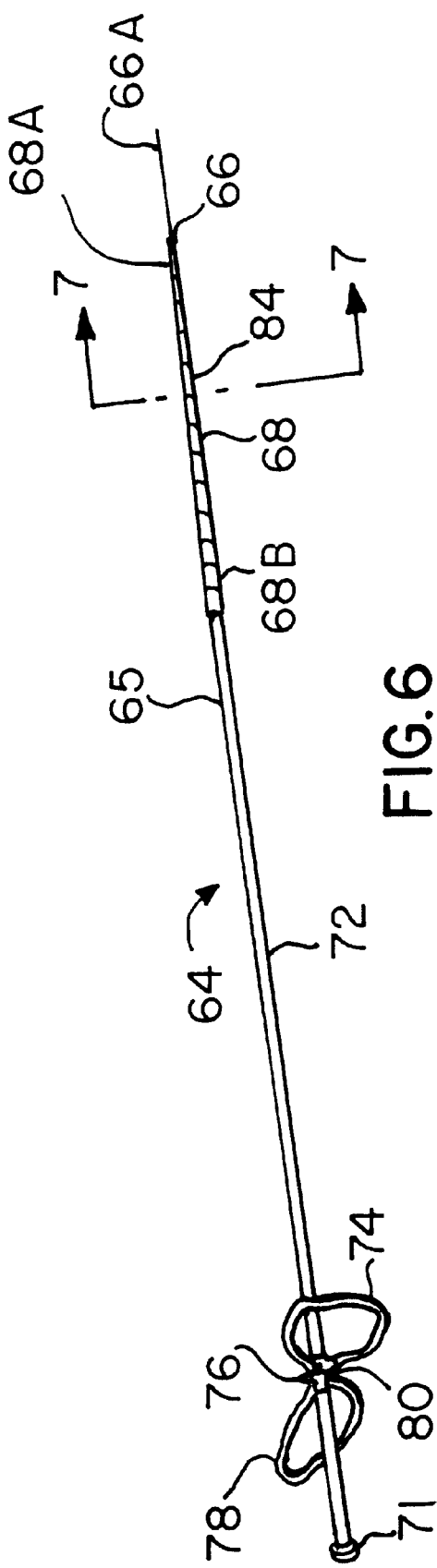

SPEAR ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

A diver uses a pole spear assembly for underwater fishing, which is usually a six feet fiberglass shaft. The shaft has a spear tip at its proximal end for piercing the fish, and an elastic band permanently fixed to its distal end for propelling the spear assembly toward the fish. The shooting hand holds the end of the elastic band, which is in proximity with the rear portion of the spear assembly. The other hand loads the spear by pushing the spear back while the shooting hand moves forward to grab the forward portion of the spear. Upon the release of the shooting hand, the spear is propelled forward toward the fish while the shooting hand maintains a grip on the elastic band to prevent the escape of the fish with the spear.

However, there are several problems with the prior art assembly. There are no sights with a pole spear, so the diver must rely on "point shooting" in order to pierce the target fish. Preferably, a portion of the spear will be projected forward up to two feet in order not to make the fish aware of the presence of the diver. The length of the elastic band is chosen so that the band has maximum tension when it is about the same distance from the tip of the spear. However, designing an optimum elastic band for each individual's particular strength is virtually an impractical task.

Additionally, if the fish is hiding within a coral reef or a rock or otherwise present at a closer distance, the diver has to position the shooting hand very close to the spear tip to negotiate the shot, which will require much less band tension power, to avoid over piercing the fish and damaging the coral reef or the tip of the spear. In the prior art assembly, in order for the diver to negotiate the aiming of the spear in these situations, the diver has to advance the tip of the loaded spear pole, while placing his hand far back at the rear portion of the spear, making fishing an impractical task in such situations.

Because of these and other problems with the prior art, there is a need for an improved spear assembly for underwater fishing.

It is an object of the invention to provide for a spear assembly having means for quickly adjusting the tension power of the elastic band while keeping the shooting hand indexed in the same release position near the forward portion of the spear.

It is an object of the invention to provide a spear assembly having means to adjust the tension power of the band so that each diver can reach his maximum load potential while maintaining the release hand at an optimum distance from the tip.

It is another object of the invention to provide for a spear assembly that enables the diver to readily move around and inside undersea structures.

It is an object of the invention to provide a selective locking mechanism that allows the quick movement and repositioning of the elastic band along the axis of the shaft.

Still another object of the invention to provide for a spear assembly that enables fishing around and inside coral reef structures.

It is a further object of the invention to increase the speed of the spear underwater by reducing weight and providing a textured forward portion of the spear to create a cavitation in the water.

It is an additional object of the invention to provide for a secure hand grip near the forward portion of the spear by providing a tapered forward portion toward the spear tip and adding a texture to the surface of the forward portion.

It is a further object of the invention to provide for a shaft that includes a strengthened forward end portion to deliver forceful piercing of the fish.

It is a related object of the invention to provide for a hollow shaft having dispersed plastic foam material inside it for maintaining distal end portion of the shaft lighter underwater even after the spear is dropped by the user, i.e.; heavier the proximal end dropping like an anchor and the distal end being upright with the band being easily seen by a diver to retrieve the spear.

Yet another object of the invention is to provide for a spear assembly having a plurality of selectively movable elastic bands and a plurality of lock means respectively for providing additional force and/or equalizing forces to both sides of a spear for propelling the assembly underwater.

BRIEF SUMMARY OF THE INVENTION

The present invention relates to a spear assembly, that has no mechanical trigger devices, for underwater fishing. The spear assembly includes a hollow elongated shaft that has a longitudinal axis and includes forward and rear portions. The forward portion has a proximal end that terminates with a replaceable sharp spear tip and a distal end rigidly connected to the rear portion. Tension means or an elastic band is mounted on the shaft at the rear portion for propelling the spear against urging of the tension means to cause the tip to pierce a fish. Selectively movable and lockable mechanical means are slidably disposed on the rear portion of the shaft for carrying the tension means to different locations on the shaft.

In one embodiment according to the present invention, the movable and lockable mechanical means include lock means mounted on the rear portion for carrying the tension means and automatically locking when the tension means is stretched toward the spear tip. The lock means include a U-shaped body part partially surrounding the shaft and including a pair of upstanding facing walls. A locking lever has proximal and distal ends and pivotally connected to and between the upstanding walls and has a camming part at the distal end of the locking lever. The tension means are coupled to the proximal end of the locking lever to urge the camming part of the lever to engage the shaft when the tension means are tensioned toward the spear tip.

In an alternative embodiment according to the present invention, the tension means or the elastic band is carried on a slidable bushing mounted rear portion of the shaft, and has a tab at the top of the bushing for coupling the band. A lock that includes a sleeve, which is substantially surrounding the shaft in located in front of the bushing, and terminates with pair of outwardly extending flanges, which are drawn together by a bolt and nut to prevent the bushing from moving forwardly when the bolt and the nut tighten the sleeve around the shaft. The ability to move the elastic band along the axis of the shaft enables the diver to increase or decrease the distance between the spear tip and the elastic band according to his needs when fishing around or inside undersea structures or coral reef. By shortening the distance between the spear tip and the elastic band, the diver can stretch the band and locate it in his shooting hand closer to the spear tip on the shaft.

In another embodiment of the present invention, the spear assembly includes a hollow elongated shaft, which is filled with rigid foam plastic material to inhibit entry of water and to rigidify the shaft. The forward portion of the shaft is tapered from the distal end toward the proximal end adjacent the spear tip and enlarging in circumference generally medially of the shaft from the proximal end toward the distal end of the forward portion to prevent the movable and lockable mechanical means from moving beyond the distal end for providing additional force and/or equalized forces to both sides of the spear for propelling the assembly underwater.

Another embodiment according to the present invention includes a pair of elastic bands to propel the spear faster and more evenly underwater when those bands are released after being tensioned. The bands are disposed on opposite sides of the spear and are carried on the shaft by respective lock means that are slidably movable and settable on the shaft.

An alternative embodiment of the present invention includes a hollow shaft having a rigid foam plastic material inside it and having a forward portion including a metallic rod for strengthening the shaft forward end portion. The rod is secured to and within the forward portion and extending within the hollow of the forward portion from a position spaced from the distal end to and forwardly of the proximal end of the forward portion. The surface of the forward portion may be textured to create cavitation under the water as the spear is propelled to increase the speed of the shaft, and to assist the user in gripping the forward portion. The foam material fills the remainder of the hollow shaft to exclude water and provides some rigidification of the rear portion of the spear. If the spear slips away from the diver underwater, it tends to upright itself vertically wherein the rear portion, which-is filled with foam, becomes the upper portion and the forward portion becomes the lower portion, for easy retrieval due to the band being highly visible by color.

BRIEF DESCRIPTION OF THE DRAWINGS

The novel features which are believed to be characteristic of the present invention are set forth with particularity in the appended claims. The invention itself, however, both as to its organization and method of operation, together with further objects and advantages thereof may be understood by reference to the following description taken in connection with the accompanying drawings in which:

FIG. 5 is a longitudinal cross sectional view along the longitudinal axis of the shaft depicting the lock means in engaging position with the shaft to prevent forward movement of the lock means and another release position wherein the lock means disengages from the shaft to allow for movement of shaft;

FIG. 6 is a pictorial view of another embodiment in accord with the present invention having a pair of elastic band respectively carried on a pair of lock means; and FIG. 7 is an enlarged view showing the contoured surface of the forward portion of the shaft.

DETAILED DESCRIPTION OF THE INVENTION

Figure 1:
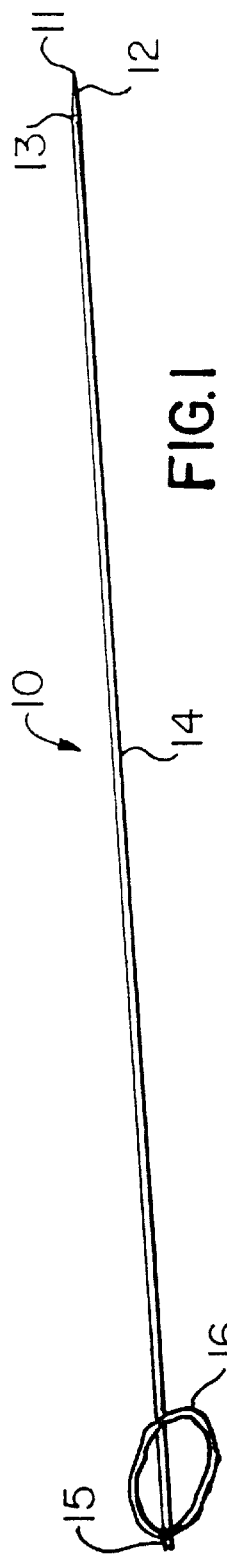
FIG. 1 is a pictorial representation of a prior art spear assembly having an elastic band secured to the end of a shaft.
Figure 2:
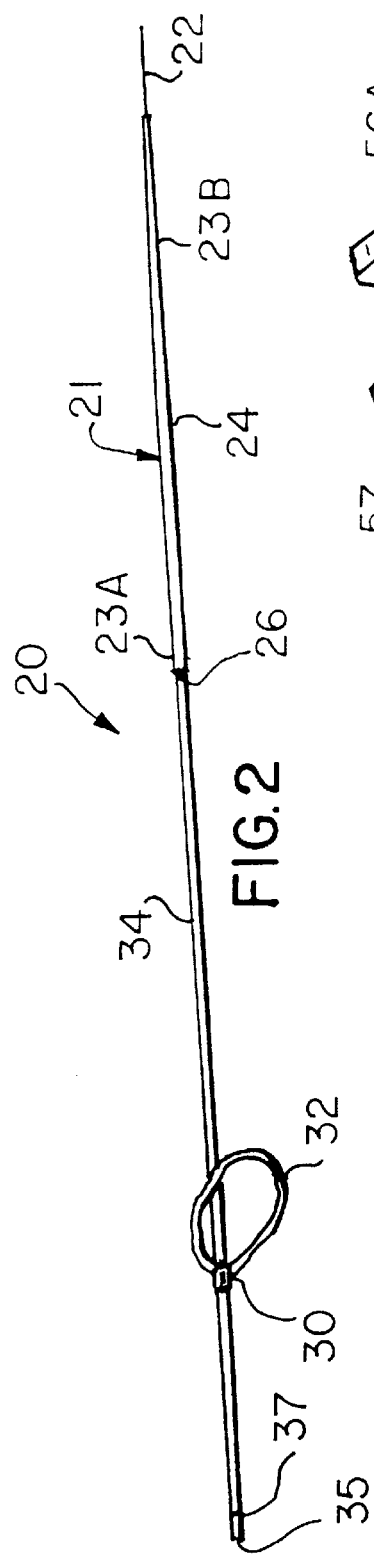
FIG. 2 is a pictorial representation of one embodiment in accord with the present invention having a selectively movable elastic band coupled to movable and lockable mechanical means having lock means.
Figure 3:
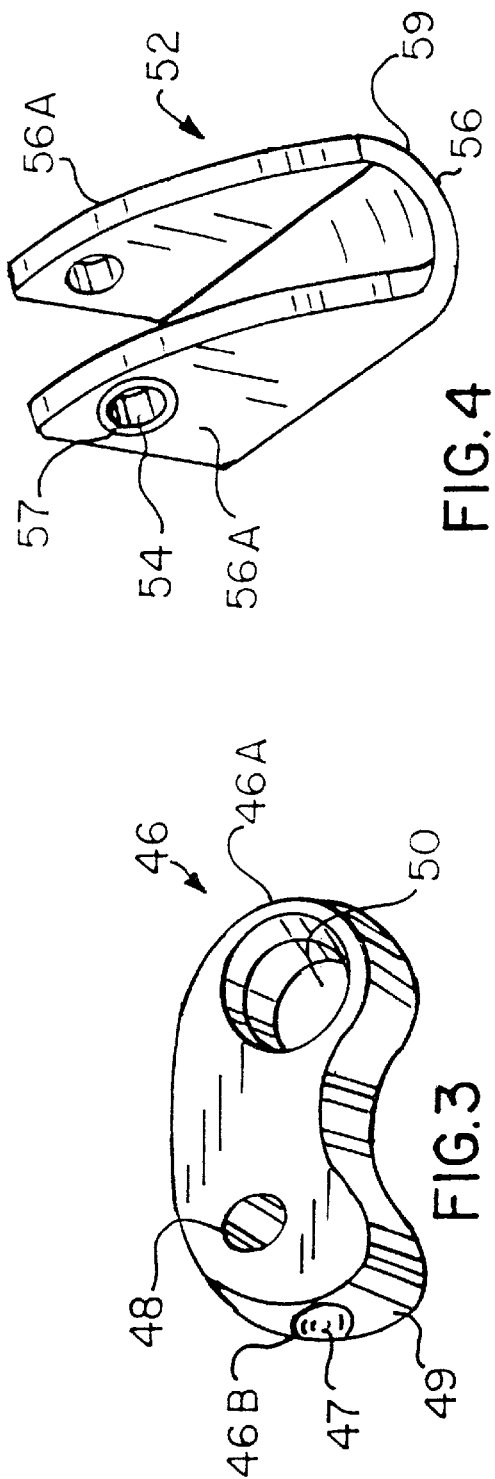
FIG. 3 is an isometric view of a lever portion of the lock means.
Figure 4:
FIG. 4 is an isometric view of the U-shaped body portion of the lock means.

The present invention is best understood by reference to the attached drawings wherein FIG. 1 shows a prior art spear assembly, FIG. 2 shows one embodiment in accord with the present invention wherein an elastic band is coupled to movable and lockable mechanical means including lock means, FIGS. 3–5 illustrates details of the lock means, FIG. 6 shows another embodiment of the present invention wherein the spear assembly has a pair of elastic bands respectively carried by a pair of lock means, FIG. 7 shows a cross section of the forward portion of the shaft of FIG. 6, and FIGS. 8–10 show a slidable bushing mounted on the shaft and a sleeve lock forming a forward stop for the bushing as part of another embodiment of the invention.

FIG. 1 shows a prior art assembly 10, which includes a steel shaft 14 that has a spear 12 that terminates with a spear tip 11 at a proximal end 13 and an elastic band 16 permanently fixed to a distal end 15. Typically, a portion of the shaft 14 will be projected forward up to two feet in order not to make the fish aware of the presence of the diver. The length of the elastic band 16 is chosen so that the band 16 has maximum tension when it is about the same distance from the tip of the spear 11. However, designing an optimum elastic band 16 for each diver is a difficult task.

When the diver fishes inside coral reefs or other undersea structures, the diver positions the shooting hand very close to the spear tip 11 to negotiate the shot, which will require much less tension power in the band 16, to avoid over piercing the fish or damaging the structure or the tip of the spear 11. Additionally, in order for the diver to negotiate the aiming of the spear 12, the diver has to advance the spear tip 11 while placing his hand far back at the rear portion 15 of the shaft 14, making it difficult to fish inside the structure.

FIG. 2 shows the spear assembly 20 of the present invention, which includes a fiberglass hollow shaft 21 that has a forward portion 24, a rear portion 34 and movable and lockable mechanical means 30, which is slidable along the rear portion 34. The forward portion 24 includes a spear tip 22 and is tapered from a distal end 23A toward a proximal end 23B in proximity with the spear tip 22 and enlarging in circumference generally medially of the shaft 21 from the proximal end 23B toward the distal end 23A of the forward portion 24 from about ⅜" to ⅝" outside diameter to prevent the movable and lockable mechanical means 30 from moving beyond the end of the forward portion 26. The spear tip 22 may be a typical spear tip as known in the art or a replaceable sharp spear tip in accord with Applicant's U.S. Pat. No. 4,896,450, which is incorporated here by reference.

The forward portion 24 and the rear portion 34 are preferably made of carbon fiber sheets rolled into a cylinder. The rear portion 34 is glued to the forward portion 24, and has a uniform outside diameter of about ½" and terminates with a cap 35 pivotally engaged with the shaft 21 by a pin 37 that passes through a passage, not shown, on both sides of the cap 35 aligned with a passage, not shown, on each side of the shaft 21. In order to mount the movable and lockable mechanical means 30 on the shaft 21, the pin 37 and the cap 35 must be pulled out to slide the means 30 on the shaft 21. The pin 37 and the cap 35 are placed back in their positions to prevent the means 30 from sliding off the rear portion 34.

FIG. 3 shows an isometric view of the lever part 46 of lock means 40. The lever 46 is a C-shaped body part, which has a proximal end 46A and a distal end 46B. The proximal end 46A includes a passageway 50 for coupling an elastic band 32. The distal end 46B has a camming part 49 for engaging the shaft 21, which includes a depression 47 at the bottom of the camming part 49 conforming generally to the round outer surface of the shaft 21.

FIG. 4 shows a cam part 52 of the lock means 40. The slidable U-shaped body 56 partially surrounds the shaft 21 and has a pair of upstanding facing walls 56A. Each of the upstanding walls 56A has a passageway 54, which is surrounded by a countersink 57 on each of the upstanding walls 56A of the body 56. The cam part 52 is pivotally coupled to the lever part 46 by aligning the passageway 54 with a passageway 48 located near the distal end 46B of the lever 46 to receive a pivot pin 58, as shown in FIG. 5. The lever 46 is shown as capable of moving between two positions 60 and 62 in FIG. 5. When the band 32 is stretched toward the spear tip 22, the band 32 urges the camming part 49 of the lever 46 to engage the shaft 21, as in position 60. The shaft 21 becomes forcibly sandwiched between the camming part 49 of the lever 46 and the inner surface 59 of the body part 52. As a result, the lock means 40 cannot move forward because of the friction between the camming part 49 and the shaft 21 and the friction between the inner surface 59 and the shaft 21.

In order to slide the lock means 40 to a different position along the shaft 21, the lever 46 must be pivoted counterclockwise to disengage the camming part 49 from the shaft 21, as in position 62, and thus enable free movement of the lock means 40 to a new selected position. The ability to move the lock means 40, which carries the elastic band 32, enables the diver to quickly adjust the tension power of the elastic band 32 while keeping the shooting hand indexed in the same position near the forward portion 24 of the shaft 21 to move around and inside undersea structures. The proximity of the elastic band 32 and the spear tip 22 enables the diver to maneuver the forward portion 24 inside and around convoluted undersea structures to spear the nearby fish. Moreover, the mobility of the elastic band 32 enables each diver to reach his maximum load potential while maintaining the release hand at an optimum distance from the spear tip 22. The selective lock means 40 allows quick movement and repositioning of the elastic band 32 along the axis of the shaft 21. The shaft 21 is shown as being filled with rigid foam plastic material 61 to inhibit entry of water and to rigidify the shaft 21.

Attention is now being drawn to FIGS. 6 and 7. FIG. 6 shows an alternative spear assembly 64 of the present invention including a pair of tension means or elastic bands 74 and 78 carried on respective lock means 76 and 80 mounted on the rear portion of the shaft 72 for providing additional force to propel the shaft 65 faster. The pair of bands 74 and 78 are located diametrically opposite each other on both sides of the shaft 65 providing equalized forces on the shaft 65, which assist in directing the spear 66 in the appropriate longitudinal axis of the shaft 65.

The hollow shaft 65, which has a forward portion 68 and a rear portion 72 that terminates with a cap 71, is filled with a rigid plastic foam material to prevent water from entering the same and to rigidify the shaft 65. The forward portion 68 includes a metallic rod 67, best shown in FIG. 7, approximately 18 inches, which extends from within the hollow of the shaft 65 from generally midway of the forward portion 68 and terminates beyond a proximal end 68A of the forward portion 68 and coupled to the spear tip 66A by being threaded on or the like to strengthen the forward portion 68 and to increase the punch delivered by the spear tip 66A.

Figure 9:
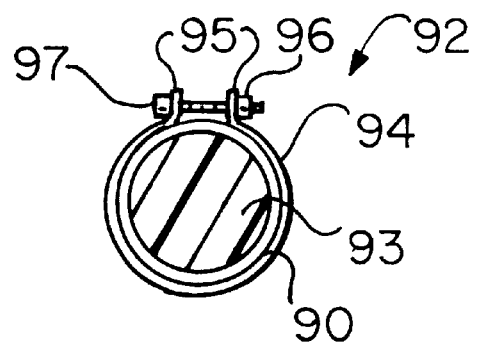
FIG. 9 is a front elevational view of a lock as part of the another embodiment of the invention.

The metallic rod 67 is inserted inside the shaft 65 and an epoxy glue 83 is wrapped around it to secure the rod 67 inside the shaft 65, as shown in FIG. 7. The foam material 93, best shown in FIG. 9, is then distributed within the shaft 65 to inhibit water entry and to rigidify the shaft 65. If the shaft 65 slips away from the diver underwater, it tends to upright itself with the rear portion 72 becoming the upper portion and the forward portion 68 dropping like an anchor for easy retrieval due to the band 74 or 78 being highly visible by color.

FIG. 7 shows that the surface of the forward portion 68 has textures 84 to be like a continuous winding and spiral overlap of a tape. The textures 84 are created by wrapping the shaft 65 and a resin 82 with a sealing tape with a spiral overlap and then allowing it to cure. The tape is then removed to create the outer surface textures 84, which create cavitation near the spear tip 66A to increase the velocity the shaft 65. The trailing edge of the textures 84 is slightly higher laterally of the shaft 65 from the distal end 68B to the proximal end 68A of the forward portion 68.

Figure 8:
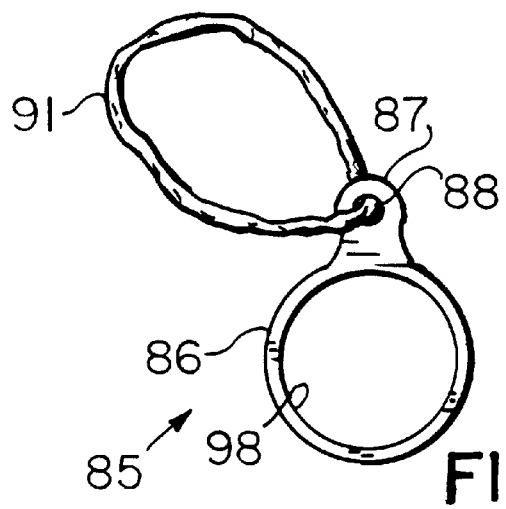
FIG. 8 is front elevational view of a bushing carrying a band as part of another embodiment of the invention.
Figure 10:
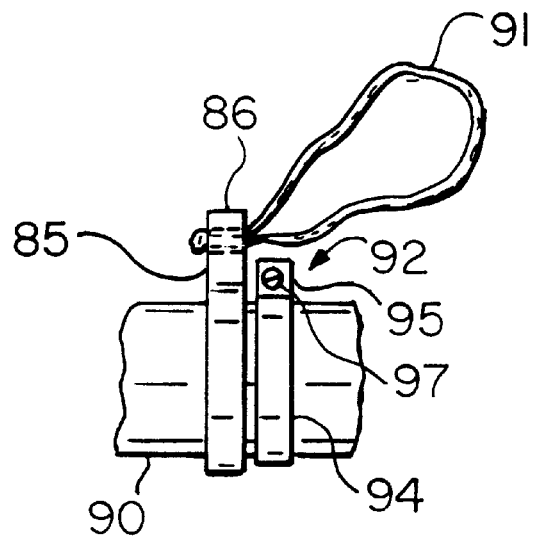
FIG. 10 is a side elevational view of both FIGS. 8 and 9 showing the bushing slidable along the shaft and having a tab at the top of the bushing for coupling the band and the sleeve lock forming a forward stop for the bushing.

Attention is now being drawn to FIGS. 8–10. FIG. 8 shows a selectively movable bushing 85 mountable on a shaft 90, which is filled with rigid foam plastic material 93 to rigidify the shaft 90. The bushing 85 includes a sleeve 86 slidably mounted about the longitudinal axis of the shaft 90 and has a tab 87 at the top of the sleeve 86, which includes a passageway 88 to receive the elastic band 91, and has an opening 98 slightly larger than the diameter of the shaft 90 and freely movable therein. In order to prevent the bushing 85 from moving forward when the elastic band 91 is tensioned forward, a slidable lock 92, as shown in FIG. 9, is substantially mounted on the shaft 90 and forwardly of the bushing 85. The lock 92 includes a rounded sleeve 94 that terminates with a pair of outwardly extending flanges 95, which are drawn together by a releasable locking bolt 97 and nut 96 to prevent the bushing 85 from moving forwardly when the bolt 97 and the nut 96 tighten the sleeve 94 around the shaft 90. If the diver desires to move the band 91 forward in order to position the shooting hand close to the spear tip of the shaft 90 to negotiate the aiming of the spear of the shaft 90 in a confined area, the diver disengages the nut 96 and the bolt 97 in the lock 92 to slide the lock 92 along the shaft 90 close to a selected position of the band 91 before locking the lock 92 by reengaging the nut 96 and the bolt 97. The diver then slides the bushing 85, which carries the band 91, to the selected position, which is now secured by the lock 92 that will prevent forward movement of the bushing 85.

FIG. 10 shows a side elevational view of the bushing 85, which is slidable along the shaft 90 and has a tab 87 at the-top of the bushing 85 for coupling the band 91. The lock 92 forms a forward stop for the bushing 85 forwardly when the bolt 97 and the nut 96 tighten the sleeve 94 around the shaft 90.

While the invention has been described with respect to certain specific embodiments, it will be appreciated that many modifications and change may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A spear assembly for underwater fishing comprising an elongated shaft having a longitudinal axis and including a forward portion having proximal and distal ends and a rear portion and having a spear tip coupled to said proximal end of said forward portion, tension means for forwardly propelling said spear against urging of said tension means to cause said tip to pierce a fish, and a selectively movable and lockable mechanical means slidably disposed on said rear portion of said shaft for carrying said tension means to different locations on said shaft, said tension means being continuously affixed to said mechanical means.

2. The spear assembly of claim 1 wherein said mechanical means includes lock means mounted on said rear portion of said shaft for carrying said tension means and automatically locking when said tension means is stretched toward said spear tip of said shaft.

3. The spear assembly of claim 1 wherein said movable mechanical means includes a bushing sidably mounted on said rear portion of said shaft and a slidable lock sleeve mounted on said rear portion of said shaft in proximity with and forwardly of said bushing and being lockable at different locations on said rear portion of said shaft.

4. The spear assembly of claim 1 wherein said shaft is hollow and substantially filled with foamed polymeric material to prevent water from entering same and rigidify said shaft.

5. The spear assembly of claim 1 wherein said forward portion of said elongated shaft includes a metal member extending from within said hollow of said shaft forwardly and terminating in proximity with said spear tip at said proximal end of said forward portion.

6. The spear assembly of claim 5 wherein said shaft includes a plurality of carbon fiber sheets rolled about said metal member and glued internally of said shaft.

7. The spear assembly of claim 1 wherein said forward portion being tapered from said distal end toward said proximal end adjacent said spear tip and enlarging in circumference generally medially of said shaft from said proximal end toward said distal end of said forward portion to prevent said movable mechanical means from moving beyond said distal end.

8. The spear assembly of claim 2 wherein said lock means includes a U-shaped body part partially surrounding said shaft and including a pair of upstanding facing walls, a locking lever having proximal and distal ends and pivotally connected to and between said upstanding walls and having a camming part at said distal end of said locking lever and being selectively engageable with said shaft, said tension means being connected to said proximal end of said lever and urging said camming part into a locking engagement with said shaft when tensioned toward said spear tip.

9. The spear assembly of claim 1 wherein said tension means includes a pair of elastic bands, and said movable mechanical means includes a pair of lock means for respectively carrying said elastic bands and locking automatically when said elastic bands are stretched toward said spear tip.

10. The spear assembly of claim 1 wherein said forward portion is textured from said distal end toward said proximal end to assist in gripping said forward portion and to create a cavitation underwater near said spear tip thereby increasing the velocity of said shaft.

11. A spear assembly for underwater fishing comprising a longitudinal shaft having forward and rear portions, said forward portion having proximal and distal ends and having a spear tip coupled to said proximal end of said forward portion, a pair of elastic bands for propelling said spear against urging of said bands, a pair of selectively movable lock means mounted on said rear portion, said pair of bands being coupled to respective said pair of lock means, said pair of lock means automatically locking prevent forward movement of said pair of lock means when said pair of bands are stretched forwardly toward said spear tip, and said pair of lock means being diametrically oppositely positioned on sides of said shaft for providing equalized forces on said shaft to assist in directing said shaft along a longitudinal axis of said shaft.

12. The assembly of claim 11 wherein each said lock means includes a bushing slidable mounted on said shaft and a lock including a slidable locking sleeve substantially mounted on said shaft and being lockable at different locations on said rear portion of said shaft.

13. The assembly of claim 11 wherein said forward portion is tapered from said distal end toward said proximal end adjacent said spear tip and enlarging in circumference generally medially of said shaft from said proximal end toward said distal end of said forward portion to prevent said pair of lock means from moving beyond said distal end.

14. The assembly of claim 11 wherein said shaft is hollow and substantially filled with foamed polymeric material to prevent water from entering said shaft and to rigidify said shaft, and said shaft further includes a metal rod secured to said shaft and extending from within said hollow of said forward portion from a position spaced from said distal end to and forwardly of said proximal end.

15. The spear assembly of claim 11 wherein each of said pair of lock means includes a U-shaped body part partially surrounding said shaft and a pair of upstanding facing walls, a locking lever having proximal and distal ends and pivotally connected to and between said walls and having a camming part at said distal end of said locking lever and selectively engageable with said shaft, and tension means being connected to said proximal end of said locking lever to urge said camming part into locking engagement with said shaft when tensioned toward said spear tip.

16. The spear assembly of claim 11 wherein each of said pair of lock means includes a locking lever having proximal and distal ends and a camming part at said distal end of said locking lever, tension means being coupled to said proximal end of said lever, a U-shaped body part containing said lever, and pivot means for attaching said lever to said body part so that when said lever is locked said shaft is forcibly sandwiched between said camming part of said lever and said body part.

17. The assembly of claim 11 wherein said forward portion being textured from said distal end toward said proximal end to assist in gripping said forward portion and to create a cavity underwater near said spear tip thereby increasing the velocity of said shaft.

18. A spear assembly for underwater fishing comprising an elongated hollow shaft having a forward portion including proximal and distal ends and rear portion and including a replaceable sharp spear tip at a proximal end of said forward end portion for piercing and catching fish, a tension means located on said rear portion for propelling said shaft, and selectively movable and lockable mechanical means slidably mounted on said shaft for carrying said tension means and preventing forward movement thereof after being locked, said forward portion being tapered and enlarging in circumference generally medially from said distal end toward said proximal end near said spear tip, said forward portion being textured to create turbulence to increase velocity of said shaft underwater and to assist in gripping said forward portion, said forward portion includes a metal member extending from within said shaft forwardly and terminating in proximity with said spear tip to provide strength and weight to said forward portion, said shaft being substantially filled with foamed polymeric material to prevent water from entering same and to rigidify said shaft, said shaft includes carbon fiber sheets rolled about said metal member and glued internally of said shaft.

19. The spear assembly of claim 18 wherein said movable mechanical means include a bushing slidably mounted on said shaft and a lock having a slidable locking sleeve forwardly of said bushing and being lockable on said shaft.

20. The spear assembly of claim 18 wherein said movable mechanical means include a lock means for carrying said tension means and automatically locking in a selected location when said tension means is stretched toward said spear tip.

21. The spear assembly of claim 18 wherein said lock means includes a U-shaped body part partially surrounding said shaft and a pair of upstanding facing walls, a locking lever having proximal and distal ends and pivotally connected to and between said upstanding walls and having a camming part at said distal end of said locking lever and selectively engageable with said shaft, said tension means being connected to said proximal end of said lever and urging said camming part into a locking engagement with said shaft when tensioned toward said spear tip.

* * * * *